United States Patent
Li

(10) Patent No.: US 12,278,327 B1
(45) Date of Patent: Apr. 15, 2025

(54) DENSIFIED CELL ASSEMBLY AND METHOD FOR PREPARING SAME

(71) Applicant: Factorial Inc., Woburn, MA (US)

(72) Inventor: Kwan Li, Reading, MA (US)

(73) Assignee: Factorial Inc., Woburn, MA (US)

( * ) Notice: Subject to any disclaimer, the term of this patent is extended or adjusted under 35 U.S.C. 154(b) by 0 days.

(21) Appl. No.: 18/861,261

(22) PCT Filed: May 13, 2024

(86) PCT No.: PCT/US2024/029020
§ 371 (c)(1),
(2) Date: Oct. 29, 2024

(87) PCT Pub. No.: WO2024/238432
PCT Pub. Date: Nov. 21, 2024

Related U.S. Application Data

(60) Provisional application No. 63/502,186, filed on May 15, 2023.

(51) Int. Cl.
*H01M 10/04* (2006.01)
*H01M 50/105* (2021.01)

(52) U.S. Cl.
CPC ..... *H01M 10/0481* (2013.01); *H01M 50/105* (2021.01)

(58) Field of Classification Search
CPC ............ H01M 50/105; H01M 10/0481
See application file for complete search history.

(56) References Cited

U.S. PATENT DOCUMENTS

| | | | |
|---|---|---|---|
| 4,477,545 A | 10/1984 | Akridge et al. | |
| 9,266,780 B2 | 2/2016 | Ogasa | |
| 10,403,925 B1 | 9/2019 | Ogata et al. | |
| 11,108,075 B2 | 8/2021 | Ogata et al. | |
| 2014/0082931 A1 | 3/2014 | Nishino et al. | |
| 2021/0280897 A1* | 9/2021 | Ikeda | H01M 4/043 |

FOREIGN PATENT DOCUMENTS

| | | |
|---|---|---|
| EP | 2894705 B1 | 7/2016 |
| EP | 3951816 A1 | 2/2022 |

OTHER PUBLICATIONS

Jul. 15, 2024 International search report and written opinion for PCT/US24/29020.
Dixit M, Beamer C, Amin R, Shipley J, Eklund R, Muralidharan N, Lindqvist L, Fritz A, Essehli R, Balasubramanian M, Belharouak I. The role of isostatic pressing in large-scale production of solid-state batteries. ACS Energy Letters. 2022, 7(11): 3936-3946.
Tan DH, Meng YS, Jang J. Scaling up high-energy-density sulfidic solid-state batteries: A lab-to-pilot perspective. Joule. 2022, 6(8):1755-1769.

* cited by examiner

*Primary Examiner* — Lingwen R Zeng

(57) ABSTRACT

Disclosed is a densified cell assembly and methods for preparing the same. In one embodiment, an isostatic press is applied to a bag which contains a plate and two elastic substrates enveloping a cell pouch, wherein one or more tabs are extended from the cell pouch, wherein the cell pouch accommodates a cell stack comprising one or more electrode layers and one or more electrolyte layers. In one embodiment, the tabs are not damaged or disconnected from the cell pouch due to compression.

20 Claims, 2 Drawing Sheets

333,327 B1

DENSIFIED CELL ASSEMBLY AND METHOD FOR PREPARING SAME

CROSS-REFERENCE

The present application is a national stage application of PCT/US24/29020, filed May 13, 2024, which claims the benefit of U.S. Ser. No. 63/502,186, filed May 15, 2023, the entire content of which is incorporated herein by reference into this application.

FIELD

This disclosure relates to a densified cell assembly and methods for preparing the same.

BACKGROUND

In comparison to conventional batteries with liquid electrolytes, all solid-state batteries (ASSBs) employ solid electrolytes which exhibit a better safety profile because it is free of liquid electrolyte leakage. However, the electrolyte/electrode interface has a relatively high resistance due to the poor contact between two solid surfaces. To reduce the contact resistance, a uniaxial compression is usually applied to a stack of cell components to keep the solid electrolyte and electrode in intimate contact with each other. A mechanical pressing or an isostatic pressing is usually performed to bring the cell components together. Isostatic pressing shows an improved consistency and uniformity in comparison with mechanical pressing.

However, isostatic pressing by definition exerts forces in all directions which may still damage fragile components such as electrode tabs and current collectors during compression of a cell assembly, which leads to a deteriorated performance. Thus, there remains a need for a new design and method to protect such fragile components during assembly.

SUMMARY

The present disclosure provides a densified cell assembly and methods for preparing the same. In one embodiment, an isostatic pressure is applied to a bag which contains a plate and two elastic substrates enveloping a cell pouch, wherein one or more tabs are extended from the cell pouch. In some embodiments the cell pouch may accommodate a cell stack having one or more electrode layers and one or more electrolyte layers. In one embodiment, the tabs are not damaged (e.g., disconnected from the cell pouch or cut) due to the isostatic compression. An apparatus for performing the method is also disclosed.

BRIEF DESCRIPTION OF THE FIGURES

Non-limiting embodiments of the present disclosure will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure.

DETAILED DESCRIPTION

Disclosed herein is a method for preparing a densified cell assembly that minimizes or prevents damage to the tabs of the cell assembly. The method includes the use of a isostatic pressure (IP) to densify the cell while sandwiching the cell assembly between two elastic substrates that provide cushioning and protection to the tabs during the application of isostatic pressure. In one embodiment, the method comprises:

1) placing a plate, a cell assembly, a first elastic substrate, and a second elastic substrate into a bag such that the second elastic substrate is adjacent the plate and the cell assembly is between the first elastic substrate and the second elastic substrate to create a filled bag, wherein the cell assembly comprises a cell pouch, a cell stack in the cell pouch, and one or more tabs extending from inside the pouch to outside the pouch;
2) placing the filled bag into a chamber filled with a working fluid; and
3) loading a working pressure to the working fluid, which applies a isostatic compression to the filled bag, thereby compressing the cell stack in the cell pouch, leading to a densified cell assembly, wherein the first elastic substrate and the second elastic substrate protect the one or more tabs from damage due to the isostatic compression.

Figure 1:
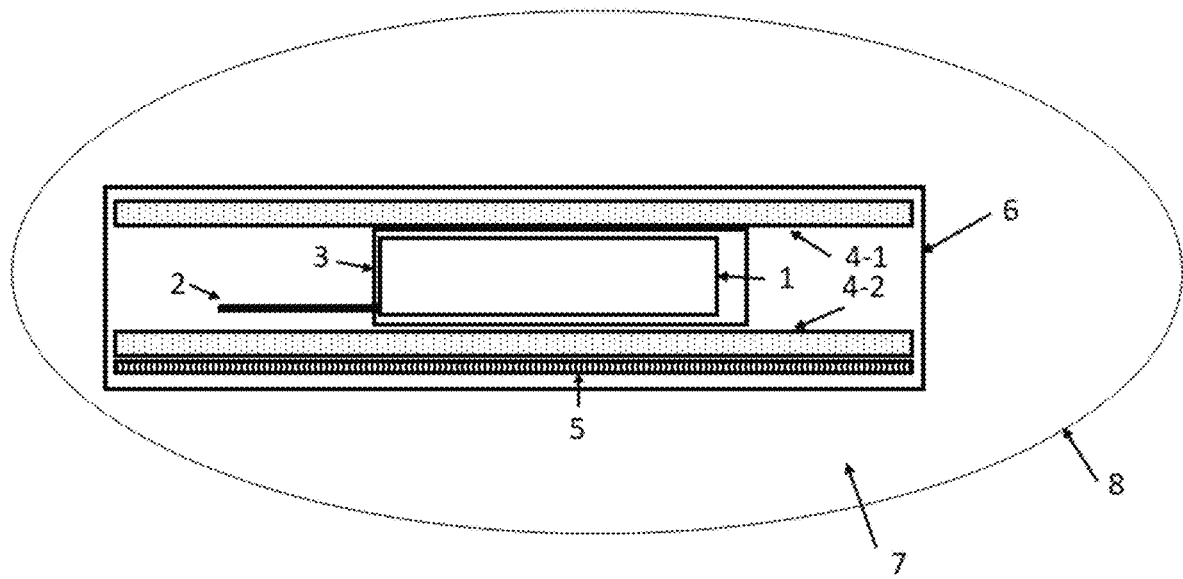
FIG. 1 is a schematic diagram showing a typical configuration of a cell assembly in connection with a preparation method according to one embodiment of the present disclosure.

As shown in FIG. 1, cell stack (1) is in cell pouch (3). Tab (2) is extended from the cell stack (1) and extends outside cell pouch (3). The cell pouch (3) is sandwiched between a first elastic substrate or sheet (4-1) and a second elastic substrate or sheet (4-2). A plate (5) is placed adjacent the second elastic substrate (4-2) such that second elastic substrate (4-2) is located between cell pouch (3) and plate (5). A bag (6) accommodates plate (5), first and second elastic substrates (4-1 and 4-2), and cell pouch (3) sandwiched therebetween. Bag (6) is subject to a isotactic pressure by a working fluid (7) in a chamber (8). When a working pressure is applied to the working fluid, the bag is isostatically pressed, the cell stack in the cell pouch is thus compressed and densified. With such method, the tabs are well protected and are not damaged or disconnected from the cell stack due to the compression.

Figure 2A:
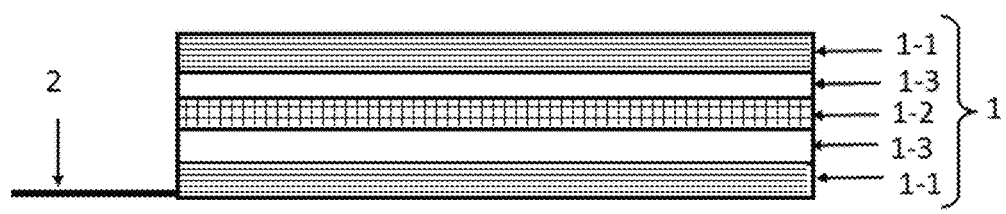
FIG. 2A is a schematic diagram showing a typical cell stack according to one embodiment of the present disclosure.
Figure 2B:
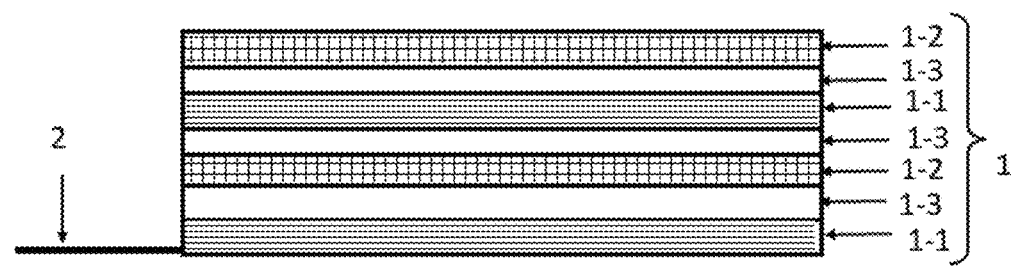
FIG. 2B is a schematic diagram showing a typical cell stack according to one embodiment of the present disclosure.

In one embodiment, a typical cell stack comprises one or more electrolyte layers and one or more electrode layers. As shown in FIG. 2A and FIG. 2B according to some embodiments of the present disclosure, cell stack (1) comprises a first electrode (1-1), a second electrode (1-2), an electrolyte (1-3) sandwiched between first electrode (1-1) and second electrode (1-2). In one embodiment, a cell stack may comprise one or more first electrodes. In one embodiment, a cell stack may comprise one or more second electrodes. In one embodiment, either the first or second electrode is an anode or a negative electrode. In one embodiment, either the first or second electrode is a cathode or a positive electrode.

Figure 3:
FIG. 3 is a schematic diagram showing a typical cell assembly according to one embodiment of the present disclosure.

In one embodiment, a cell assembly (9) of the present disclosure refers to a cell stack (1) in cell pouch (3) and a tab extending from cell stack (1) to the outside of cell pouch (3) as typically shown in FIG. 3. In some embodiments, cell pouch (3) is integrated with cell stack (1).

Figure 4:
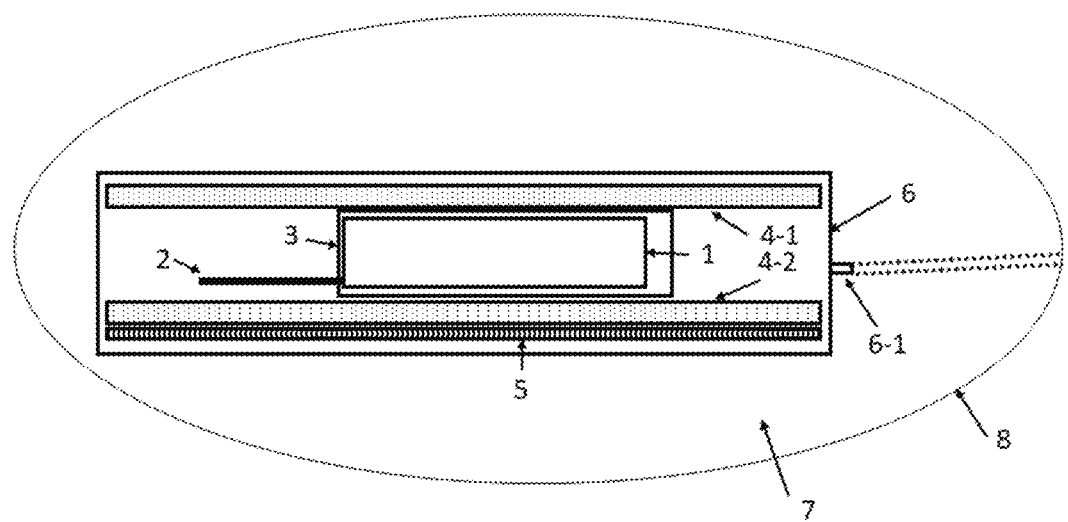
FIG. 4 is a schematic diagram showing a typical configuration of a cell assembly in connection with a preparation method according to one embodiment of the present disclosure.

In one embodiment, bag (6) is vacuum sealed before loading the working pressure to the working fluid. In one embodiment, the bag (6) has an opening (6-1) as shown in FIG. 4. In one embodiment, the opening (6-1) is extended to the outside of the chamber (8). In one embodiment, the bag (6) is sealed during the working pressure is loaded to the working fluid.

In one embodiment, the method of the present disclosure is characterized in the controlled deformation of the elastic substrates is controlled. In one embodiment and shown in FIG. 5, after the isostatic pressing, first elastic substrate (4-1) deforms toward second elastic substrate (4-2) and exhibits a deformation greater than that of the second elastic substrate (4-2). Tabs (2) are covered by the first and second elastic substrates. Due to a controlled deformation of the second elastic substrate (4-2), the stress on tabs (2) is dissipated. The fragile components such as tabs (2) are thus protected from damage due to deformation and displacement.

Figure 5:
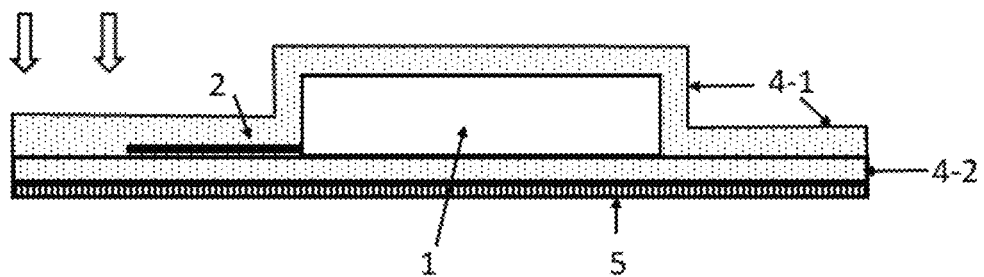
FIG. 5 is a schematic diagram showing a typical configuration of a cell assembly with a deformed elastic substrate.

Without wishing to be bound by theory, first elastic substrate (4-1) experiences an isostatic pressing as the pressure from the working fluid is the same. In one embodiment, the second elastic substrate (4-2) is close to plate (5) and therefore experiences a pseudo-isostatic compression because the working fluid exerts an external force directly on plate and second elastic substrate undergoes a limited deformation in comparison to first elastic substrate (4-1). Thus, the tabs laying on second elastic substrate would undergo a limited deformation and get protected from the compression as shown in FIG. 5.

In one embodiment, cell pouch (3) is vacuum sealed prior to placing the same into bag (6). In one embodiment, the cell pouch (3) has an opening in connection with the outside of bag (6) so that the residual air in the cell pouch (3) can be further extracted when the bag (6) is isostatically compressed in the working fluid. In one embodiment, the opening on the pouch is to avoid formation of bubbles which may be formed during the compression and thus affect the uniformity of the pressure on cell stack (1) in cell pouch (3).

In one embodiment, bag (6) is vacuum sealed prior to or during loading of the working pressure.

In one embodiment, the method further includes one or more of a step of unloading the working pressure to the working fluid (7) in the chamber (8), a step of removing the bag (6) from the chamber (8), and/or a step of separating the cell pouch (3) from the first and second elastic substrates (4-1 and 4-2).

The first and second elastic substrates may be the same material or different materials, including, but not limited to rubber, latex, polyurethane, or a mixture thereof. In some embodiments, a latex sheet may be made of natural rubber (NR), synthetic rubber, or a mixture thereof. In some embodiments, the latex sheet may also comprise one or more fillers such as carbon black, silica, clays to adjust the hardness, elasticity, resilience or other properties. The first and second elastic substrates are independently made of an elastic material. In some embodiments, the elastic material refers to a material that is capable of being stretched or expanded and substantially resuming former shape. In one embodiment, the first and second elastic substrates have no porous structure to avoid bubble formation caused by deformation of the elastic substrates. In one embodiment, the first and second elastic substrates have a porous structure with a porosity of no more than 10%. In one embodiment, the first and second elastic substrates have a porous structure and comprise an airway in connection with the outside of the chamber so that when the bag is compressed, the air in the porous substrates can be squeezed out and extracted from the bag. In some embodiments, first elastic substrate (4-1) may be a flexible material of sufficient thickness, that as shown in FIG. 5, can conform to the shape of cell (1), such as latex or rubber. In some embodiments, second elastic substrate (4-2) has resilience to return to its original shape once the isostatic pressure is released/removed so that second elastic substrate (4-2) may be used repeatedly. In some embodiments, the elastic substrate may be made of elastomer, foams, shape-memory materials such as shape memory alloys.

In some embodiments, first elastic substrate and/or second elastic substrate have a shore A hardness in a range from 10 to 90, from 10 to 80, from 10 to 70, from 10 to 60, from 10 to 50, from 10 to 40, from 15 to 90, from 15 to 80, from 15 to 70, from 15 to 60, from 15 to 50, from 15 to 40, 20 to 90, from 20 to 80, from 20 to 70, from 20 to 60, from 20 to 50, from 20 to 40, from 25 to 90, from 25 to 80, from 25 to 70, from 25 to 60, from 25 to 50, from 25 to 40, from 30 to 90, from 30 to 80, from 30 to 70, from 30 to 60, from 30 to 50, from 30 to 40, from 35 to 90, from 35 to 80, from 35 to 70, from 35 to 60, from 35 to 50, or any and all ranges and subranges therebetween.

In some embodiments, each of the first and second elastic substrates is a sheet with a thickness in a range from 0.1 mm to 10 mm, from 0.1 mm to 9 mm, from 0.1 mm to 8 mm, from 0.1 mm to 7 mm, from 0.1 mm to 6 mm, from 0.1 mm to 5 mm, from 0.1 mm to 4 mm, from 0.1 mm to 3 mm, from 0.1 mm to 2 mm, from 0.2 mm to 10 mm, from 0.2 mm to 9 mm, from 0.2 mm to 8 mm, from 0.2 mm to 7 mm, from 0.2 mm to 6 mm, from 0.2 mm to 5 mm, from 0.2 mm to 4 mm, from 0.2 mm to 3 mm, from 0.2 mm to 2 mm, from 0.3 mm to 10 mm, from 0.3 mm to 9 mm, from 0.3 mm to 8 mm, from 0.3 mm to 7 mm, from 0.3 mm to 6 mm, from 0.3 mm to 5 mm, from 0.3 mm to 4 mm, from 0.3 mm to 3 mm, from 0.3 mm to 2 mm, from 0.4 mm to 10 mm, from 0.4 mm to 9 mm, from 0.4 mm to 8 mm, from 0.4 mm to 7 mm, from 0.4 mm to 6 mm, from 0.4 mm to 5 mm, from 0.4 mm to 4 mm, from 0.4 mm to 3 mm, from 0.4 mm to 2 mm, from 0.5 mm to 10 mm, from 0.5 mm to 9 mm, from 0.5 mm to 8 mm, from 0.5 mm to 7 mm, from 0.5 mm to 6 mm, from 0.5 mm to 5 mm, from 0.5 mm to 4 mm, from 0.5 mm to 3 mm, from 0.5 mm to 2 mm, and any and all ranges and subranges therebetween.

In some embodiments, the first and second elastic substrates are sheets sharing the same thickness. In some embodiments, second elastic sheet (4-2) is thicker than first elastic sheet. In some embodiments, second elastic sheet (4-2) has a thickness which is at least 0.1 mm, at least 0.2 mm, at least 0.3 mm, at least 0.4 mm, at least 0.5 mm, at least 0.75 mm, at least 1 mm, at least 1.25 mm, at least 1.5 mm, at least 2 mm greater than that of first elastic sheet (4-1). In some embodiments, the thicker second elastic sheet (4-2) protects the tabs (2) from being damaged or disconnected from the cell stack (1) due to less controlled deformation or displacement caused by compression.

In some embodiments, the cell stack comprises a number of layers. In some embodiments, a cell assembly comprising a cell pouch and a cell stack has a thickness in a range from 1 mm to 20 mm, from 1 mm to 15 mm, from 1 mm to 10 mm, from 1 mm to 7.5 mm, from 1 mm to 5 mm, from 1 mm to 4 mm, from 1 mm to 3 mm, from 1 mm to 2.5 mm, from 1.0 mm to 2.0 mm, from 2 mm to 20 mm, from 2 mm to 15 mm, from 2 mm to 10 mm, from 2 mm to 7.5 mm, from 2 mm to 5 mm, from 2 mm to 4 mm, from 2 mm to 3 mm, from 2 mm to 2.5 mm, from 3 mm to 20 mm, from 3 mm to 15 mm, from 3 mm to 10 mm, from 3 mm to 7.5 mm, from 3 mm to 5 mm, from 3 mm to 4 mm, or any and all ranges and subranges therebetween prior to densification. In some embodiments, the densified cell assembly has a thickness smaller than the original cell assembly. In some embodiments, the densified cell assembly has a thickness around 5%, 10%, 15%, or 20% lower than that of the original cell assembly prior to the isostatic compression.

In some embodiments, the tabs are made of a metal or an alloy for electrically connecting the cell stack with an external circuit. In some embodiments, non-limiting specific metals include aluminum and copper.

In some embodiments, the cell pouch is airtight. In some embodiments, the cell is made of a material selected from the group consisting of aluminum foil, aluminum foil with one surface coated with at least one polymer layer, aluminum foil with two surfaces each coated with at least one polymer layer and a combination thereof.

In some embodiments, the working fluid in the chamber does not infiltrate into the cell pouch. In some embodiments, the working fluid in the chamber does not infiltrate into the bag under the isostatic pressing.

In some embodiments, the bag is made of a material that can seal the bag from the working fluid. In some embodiments, the bag is made of film. In some embodiments, the film is made of polyethylene terephthalate (PET), polyethylene (PE), PU, latex, or a mixture thereof.

In some embodiments, the film is made of biaxially oriented PET (BoPET) (also known as Mylar). In some embodiments, the film of the bag has a thickness in a range from 0.01 mm to 0.5 mm, from 0.01 mm to 0.4 mm, from 0.01 mm to 0.3 mm, from 0.01 mm to 0.2 mm, from 0.01 mm to 0.15 mm, from 0.01 mm to 0.10 mm, from 0.01 mm to 0.08 mm, from 0.01 mm to 0.06 mm, from 0.01 mm to 0.04 mm, from 0.02 mm to 0.5 mm, from 0.02 mm to 0.4 mm, from 0.02 mm to 0.3 mm, from 0.02 mm to 0.2 mm, from 0.02 mm to 0.15 mm, from 0.02 mm to 0.10 mm, from 0.02 mm to 0.08 mm, from 0.02 mm to 0.06 mm, from 0.02 mm to 0.04 mm, from 0.04 mm to 0.5 mm, from 0.04 mm to 0.4 mm, from 0.04 mm to 0.3 mm, from 0.04 mm to 0.2 mm, from 0.04 mm to 0.15 mm, from 0.04 mm to 0.10 mm, from 0.04 mm to 0.08 mm, from 0.04 mm to 0.06 mm, from 0.05 mm to 0.5 mm, from 0.05 mm to 0.4 mm, from 0.05 mm to 0.3 mm, from 0.05 mm to 0.2 mm, from 0.05 mm to 0.15 mm, from 0.05 mm to 0.10 mm, from 0.05 mm to 0.08 mm, or any and all ranges and subranges therebetween. In some embodiments, the film comprises PE reinforced with a polymer fiber such as nylon with a diameter in a range from 5 μm to 1000 μm, from 5 μm to 750 μm, from 5 μm to 500 μm, from 5 μm to 250 μm, from 5 μm to 100 μm, from 5 μm to 75 μm, from 5 μm to 50 μm, from 5 μm to 25 μm, from 10 μm to 1000 μm, from 10 μm to 750 μm, from 10 μm to 500 μm, from 10 μm to 250 μm, from 10 μm to 100 μm, from 10 μm to 75 μm, from 10 μm to 50 μm, from 10 μm to 25 μm, from 25 μm to 1000 μm, from 25 μm to 750 μm, from 25 μm to 500 μm, from 25 μm to 250 μm, from 25 μm to 100 μm, from 25 μm to 75 μm, from 25 μm to 50 μm, or any and all ranges and subranges therebetween.

In some embodiments, the working fluid is a liquid or a gas. Non-limiting specific fluids include water, oil, argon, air, nitrogen, carbon dioxide, and a mixture thereof.

In some embodiments, the plate is made of a metal selected from the group consisting of titanium, aluminum, stainless steel, polymer, polymer composite, and a mixture thereof. In some embodiments, second elastic substrate (4-2) is disposed on, adhered to, laminated to, or otherwise adjacent to plate (6).

In some embodiments, the stiff plate has a thickness in a range from 0.1 mm to 10 mm, from 0.1 mm to 9 mm, from 0.1 mm to 8 mm, from 0.1 mm to 7 mm, from 0.1 mm to 6 mm, from 0.1 mm to 5 mm, from 0.1 mm to 4 mm, from 0.1 mm to 3 mm, from 0.1 mm to 2 mm, from 0.2 mm to 10 mm, from 0.2 mm to 9 mm, from 0.2 mm to 8 mm, from 0.2 mm to 7 mm, from 0.2 mm to 6 mm, from 0.2 mm to 5 mm, from 0.2 mm to 4 mm, from 0.2 mm to 3 mm, from 0.2 mm to 2 mm, from 0.3 mm to 10 mm, from 0.3 mm to 9 mm, from 0.3 mm to 8 mm, from 0.3 mm to 7 mm, from 0.3 mm to 6 mm, from 0.3 mm to 5 mm, from 0.3 mm to 4 mm, from 0.3 mm to 3 mm, from 0.3 mm to 2 mm, from 0.4 mm to 10 mm, from 0.4 mm to 9 mm, from 0.4 mm to 8 mm, from 0.4 mm to 7 mm, from 0.4 mm to 6 mm, from 0.4 mm to 5 mm, from 0.4 mm to 4 mm, from 0.4 mm to 3 mm, from 0.4 mm to 2 mm, from 0.5 mm to 10 mm, from 0.5 mm to 9 mm, from 0.5 mm to 8 mm, from 0.5 mm to 7 mm, from 0.5 mm to 6 mm, from 0.5 mm to 5 mm, from 0.5 mm to 4 mm, from 0.5 mm to 3 mm, from 0.5 mm to 2 mm, and any and all ranges and subranges therebetween.

In some embodiments, the isostatic pressing is conducted at a preferred temperature range. In some embodiments, the isostatic pressing is a cold isostatic pressing (CIP) or warm isostatic pressing (WIP). In some embodiments, the isostatic pressing is conducted at a temperature in a range from 0° C. to 150° C., from 0° C. to 140° C., from 0° C. to 130° C., from 0° C. to 120° C., from 0° C. to 110° C., from 0° C. to 100° C., from 0° C. to 80° C., from 0° C. to 60° C., from 0° C. to 40° C., 10° C. to 150° C., from 10° C. to 140° C., from 10° C. to 130° C., from 10° C. to 120° C., from 10° C. to 110° C., from 10° C. to 100° C., from 10° C. to 80° C., from 10° C. to 60° C., from 10° C. to 40° C., 20° C. to 150° C., from 20° C. to 140° C., from 20° C. to 130° C., from 20° C. to 120° C., from 20° C. to 110° C., from 20° C. to 100° C., from 20° C. to 80° C., from 20° C. to 60° C., from 20° C. to 40° C., 30° C. to 150° C., from 30° C. to 140° C., from 30° C. to 130° C., from 30° C. to 120° C., from 30° C. to 110° C., from 30° C. to 100° C., from 30° C. to 80° C., from 30° C. to 60° C., or any and all ranges and subranges therebetween.

In some embodiments, during isostatic pressing, the working fluid has a working pressure in a range from 10 MPa to 1000 MPa, from 10 MPa to 800 MPa, from 10 MPa to 600 MPa, from 10 MPa to 400 MPa, from 10 MPa to 200 MPa, from 10 MPa to 150 MPa, from 10 MPa to 125 MPa, from 10 MPa to 100 MPa, from 10 MPa to 75 MPa, from 10 MPa to 50 MPa, from 20 MPa to 1000 MPa, from 20 MPa to 800 MPa, from 20 MPa to 600 MPa, from 20 MPa to 400 MPa, from 20 MPa to 200 MPa, from 20 MPa to 150 MPa, from 20 MPa to 125 MPa, from 20 MPa to 100 MPa, from 20 MPa to 75 MPa, from 20 MPa to 50 MPa, from 30 MPa to 1000 MPa, from 30 MPa to 800 MPa, from 30 MPa to 600 MPa, from 30 MPa to 400 MPa, from 30 MPa to 200 MPa, from 30 MPa to 150 MPa, from 30 MPa to 125 MPa, from 30 MPa to 100 MPa, from 30 MPa to 75 MPa, from 30 MPa to 50 MPa, from 50 MPa to 1000 MPa, from 50 MPa to 800 MPa, from 50 MPa to 600 MPa, from 50 MPa to 400 MPa, from 50 MPa to 200 MPa, from 50 MPa to 150 MPa, from 50 MPa to 125 MPa, from 50 MPa to 100 MPa, from 50 MPa to 75 MPa, or any and all ranges and subranges therebetween.

In some embodiments, the working pressure is loaded at a controlled rate to allow slow deformation of the elastic substrates, cell pouch and the cell stack therein, which is critical in avoiding stress concentration thus achieving desirable consistency and uniformity. In some embodiments, the working pressure of the working fluid is increased at a rate in a range from 0.1 MPa/min to 20 MPa/min, from 0.1 MPa/min to 15 MPa/min, from 0.1 MPa/min to 10 MPa/min, from 0.1 MPa/min to 7.5 MPa/min, from 0.1 MPa/min to 5 MPa/min, from 0.1 MPa/min to 2.5 MPa/min, from 0.1 MPa/min to 1 MPa/min, from 0.1 MPa/min to 0.75 MPa/min, from 0.1 MPa/min to 0.5 MPa/min, 0.25 MPa/min to 20 MPa/min, from 0.25 MPa/min to 15 MPa/min, from 0.25 MPa/min to 10 MPa/min, from 0.25 MPa/min to 7.5 MPa/min, from 0.25 MPa/min to 5 MPa/min, from 0.25 MPa/min to 2.5 MPa/min, from 0.25 MPa/min to 1 MPa/min, from 0.25 MPa/min to 0.75 MPa/min, from 0.5 MPa/min to 20 MPa/min, from 0.5 MPa/min to 15 MPa/min, from 0.5 MPa/min to 10 MPa/min, from 0.5 MPa/min to 7.5 MPa/min, from 0.5 MPa/min to 5 MPa/min, from 0.5 MPa/min to 2.5 MPa/min, from 0.5 MPa/min to 1 MPa/min, from 1 MPa/min to 20 MPa/min, from 1 MPa/min to 15 MPa/min, from 1 MPa/min to 10 MPa/min, from 1 MPa/min to 7.5 MPa/min, from 1 MPa/min to 5 MPa/min, from 1 MPa/min to 2.5 MPa/min, from 2 MPa/min to 20 MPa/min, from 2 MPa/min to 15 MPa/min, from 2 MPa/min to 10 MPa/min, from 2 MPa/min to 7.5 MPa/min, from 2 MPa/min to 5 MPa/min, or any and all ranges and subranges therebetween.

In some embodiments, the working pressure is maintained for a period of time in a range from 1 min to 60 min, from 2 min to 60 min, from 3 min to 60 min, from 5 min to 60 min, from 10 min to 60 min, from 1 min to 50 min, from 2 min to 50 min, from 3 min to 50 min, from 5 min to 50 min, from 10 min to 50 min, from 1 min to 40 min, from 2 min to 40 min, from 3 min to 40 min, from 5 min to 40 min, from 10 min to 40 min, from 1 min to 30 min, from 2 min to 30 min, from 3 min to 30 min, from 5 min to 30 min, from 10 min to 30 min, from 1 min to 20 min, from 2 min to 20 min, from 3 min to 20 min, from 5 min to 20 min, from 10 min to 20 min, or any and all ranges and subranges therebetween.

In some embodiments, the densified cell assembly is a cell assembly of an all solid-state battery (ASSB). In some embodiments, the method as described herein is for preparing a densified cell assembly of an ASSB.

In some embodiments, the ASSB comprises a cell stack containing a solid electrolyte in at least one of the one or more electrolyte layers.

In some embodiments, the solid electrolyte includes a polymer solid electrolyte, an oxide-based solid electrolyte, a sulfide-based solid electrolyte, and any combination thereof.

In some embodiments, the oxide-based solid electrolyte is at least one selected from the group consisting of $Li_{1+x+y}Al_xTi_{2-x}Si_yP_{3-y}O_{12}$ ($0<x<2$, $0\leq y<3$), $BaTiO_3$, $Pb(Zr_xTi_{1-x})O_3$ (PZT, $0\leq a\leq 1$), $Pb_{1-x}La_xZr_{1-y}Ti_yO_3$(PLZT) ($0\leq x<1$, $0\leq y<1$), $Pb(Mg_{1/3}Nb_{2/3})O_3$—$PbTiO_3$(PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ ($0<x<2$, $0<y<3$), $Li_xAl_yTi_z(PO_4)_3$ ($0<x<2$, $0<y<1$, $0<z<3$), $Li_{1+x+y}(Al_aGa_{1-a})_x(Ti_bGe_{1-b})_{2-x}Si_yP_{3-y}O_{12}$ ($0\leq x\leq 1$ $0\leq y\leq 1$, $0\leq a\leq 1$, and $0\leq b\leq 1$), $Li_xLa_yTiO_3$ ($0<x<2$, $0<y<3$), $Li_2O$, $LiGH$, $Li_2CO_3$, $LiAlO_2$, $Li_2O$—$Al_2O_3SiO_2$—$P_2O_5$—$TiO_2$—$GeO_2$, $Li_{3+x}La_3M_2O_{12}$ (M is at least one selected from the group consisting of Te, Nb, and Zr, x is an integer of 1 to 10), $Li_{3+x}La_3Zr_{2-a}M_aO_{12}$, wherein M is at least one selected from Ga, W, Nb, Ta, and Al, $0<a<2$, x is an integer of 1 to 10, and mixtures thereof.

In some embodiments, the sulfide-based solid electrolyte is at least one selected from $P_2S_5$, $Li_2S$—$P_2S_5$—LiX (where X is a halogen element), $Li_2S$—$P_2S_5$—$Li_2O$, $Li_2S$—$P_{2S}$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are each a positive number, and Z is one selected from Ge, Zn and Ga), $Li_2S$—$GeS_2$, $Li_2S$—$SiS_2$—$Li_3PO_4$, $Li_2S$—$SiS_2$—$Li_pMO_q$ (where p and q are each a positive number, and M is one selected from P, Si, Ge, B, Al, Ga, and In), $Li_{7-x}PS_{6-x}Cl_x$ ($0\leq x\leq 2$), $Li_{7-x}PS_{6-x}Br_x$ ($0\leq x\leq 2$), $Li_{7-x}PS_{6-x}I_x$ ($0\leq x\leq 2$), and mixtures thereof.

In one aspect, the present disclosure also provides an apparatus for performing the isostatic pressing. In some embodiments, the apparatus comprises a chamber. In some embodiments, the chamber is filled with a working fluid. In some embodiments, the apparatus is integrated with bag (6) and when the cell assembly (9) is placed into the apparatus, the cell assembly (9) is wrapped by the bag (6). In some embodiments, the apparatus is integrated with the elastic substrates and when cell assembly (9) is placed into the apparatus, elastic substrates (4-1 and 4-2) are placed into the cell assembly (9) which is wrapped by the bag (6). In some embodiments, one or both elastic substrates are integrated with the bag (6).

The following examples are intended to illustrate certain embodiments of the present disclosure, but do not exemplify the full scope of the disclosure.

The foregoing description and following examples detail certain specific embodiments of the disclosure and describe the best mode that the inventors contemplated. It will be appreciated, however, that no matter how detailed the foregoing may appear in text, the disclosure may be practiced in many ways, and the disclosure should be construed in accordance with the appended claims and equivalents thereof.

Although the disclosed teachings have been described with reference to various applications, methods, compounds, compositions, and materials, it will be appreciated that various changes and modifications to them may be made without departing from the teachings herein. The following examples are provided to better illustrate the disclosed teachings and are not intended to limit the scope of the teachings presented herein. While the present teachings have been described in terms of these exemplary embodiments, the skilled artisan will readily understand that numerous variations and modifications of these exemplary embodiments are possible without undue experimentation. All such variations and modifications are within the scope of the teachings of this disclosure.

Examples

Preparation of Cell Assemblies

A cell stack with around eight (8) layers was sealed in a cell pouch. The cell pouch was assembled into various cell assemblies according to the configurations as set in Table 1. A latex made of natural rubber (NR) was used as top elastic substrate, bottom elastic substrate, or both in both comparative examples 1-3 and example 1. The NR latex has a shore A hardness of 40A. Polyurethane (PU) with a shore A hardness of 60A was used as the bottom elastic substrate in example 1.

TABLE 1

Configurations of cell assemblies

| Example/comp. example No | Top elastic substrate | | | Bottom elastic substrate | | |
|---|---|---|---|---|---|---|
| | Material | Thickness | Hardness | Material | Thickness | Hardness |
| Comp. 1 | N/A | N/A | N/A | NR latex | 0.76 mm | 40A |
| Comp. 2 | NR latex | 0.76 mm | 40A | N/A | N/A | N/A |
| Comp. 3 | NR latex | 0.76 mm | 40A | NR latex | 0.76 mm | 40A |
| Example 1 | NR latex | 0.76 mm | 40A | PU | 1.59 mm | 60A |

Isostatic pressing of cell assemblies and testing

Each cell assembly was placed into a bag made of Mylar (also known as biaxially-oriented polyethylene terephthalate, BoPET) with a thickness of around 0.07 mm. The bag filled with the cell assembly was then placed into a working fluid comprising water and oil. An isostatic pressing was performed by maintaining the working fluid at working pressure of 500 MPa at a temperature of 90° C. for around 30 min. After the isostatic pressing, the densified cell assemblies were obtained. The densified cell assemblies have a thickness of around 2.0 mm, which is smaller than that of the original cell assembly (~2.3 mm).

Cell teardown was conducted to observe liquid leakage and integrity of the tabs both in and out of the cell pouch in the densified cell assemblies. In some examples, open circuit voltage (OCV) was measured. A leakage of the working fluid liquid into the cell pouch was observed in the densified cell assembly of comparative example 1. No liquid leakage was observed in comparative examples 2 and 3 or example 1. It shows that the presence of an elastic substrate such as that made of NR latex can prevent the leakage of the working fluid into the cell pouch. In comparative examples 2 and 3, at least some tabs were cut or disconnected from the external leads that come out of the cell pouch, causing a decreased capacity. In contrast, having a bottom elastic substrate with a greater hardness than the top elastic substrate, as shown in example 1 can protect all tabs during the isostatic pressing. No tab was cut or disconnected or otherwise damaged in Example 1.

What is claimed is:

1. A method for preparing a densified cell assembly, comprising:
   a) placing a plate, a cell assembly, a first elastic substrate, and a second elastic substrate into a bag such that the second elastic substrate is adjacent the plate and the cell assembly is between the first elastic substrate and the second elastic substrate to create a filled bag, wherein the cell assembly comprises a cell pouch, a cell stack in the cell pouch, and one or more tabs extending from inside the pouch to outside the pouch;
   b) placing the filled bag into a chamber filled with a working fluid; and
   c) loading a working pressure to the working fluid, which applies an isostatic compression to the filled bag, thereby compressing the cell stack in the cell pouch, leading to a densified cell assembly,
   wherein the first elastic substrate and the second elastic substrate protect the one or more tabs from damage due to the isostatic compression.

2. The method of claim 1, wherein the cell pouch is vacuum sealed prior to placing it into the bag.

3. The method of claim 1, wherein the bag is vacuum sealed prior to or during loading of the working pressure.

4. The method of claim 1, wherein the first and second elastic substrates are independently made of rubber, latex, polyurethane, or a mixture thereof.

5. The method of claim 1, wherein the first or second elastic substrate has a thickness in a range from 0.1 mm to 10 mm.

6. The method of claim 1, wherein the second elastic substrate has a thickness higher than that of the first elastic substrate.

7. The method of claim 1, wherein the second elastic substrate dissipates a stress formed on the one or more tabs due to the compression of the cell stack.

8. The method of claim 1, wherein the one or more tabs are made of a metal or an alloy.

9. The method of claim 1, wherein the cell pouch is made of a material selected from the group consisting of aluminum foil, aluminum foil with one surface coated with at least one polymer layer, aluminum foil with two surfaces each coated with at least one polymer layer and combinations thereof.

10. The method of claim 1 wherein the cell pouch and the bag are not infiltrated by the working fluid.

11. The method of claim 1, wherein the bag is made of a material that can seal the bag from the working fluid.

12. The method of claim 1, wherein the working fluid is a liquid or a gas.

13. The method of claim 1, wherein the working fluid comprises at least one selected from the group consisting of water, oil, argon, air, nitrogen, carbon dioxide, and mixtures thereof.

14. The method of claim 1, wherein the plate is made of a metal selected from the group consisting of titanium, aluminum, stainless steel, polymer, polymer composite, and alloys thereof.

15. The method of claim 1, wherein the plate has a thickness in a range from 0.1 mm to 10 mm.

16. The method of claim 1, wherein the working fluid has a temperature in a range from 20° C. to 120° C.

17. The method of claim 1, wherein the working pressure is in a range 10 MPa to 1000 MPa and is maintained for a period of time in a range from 1 min to 60 min.

18. The method of claim 1, wherein the densified cell assembly is a cell assembly of an all solid-state battery (ASSB).

19. The method of claim 1, wherein the cell stack comprises at least one layer of a solid electrolyte.

20. The method of claim 19, wherein the solid electrolyte comprises an oxide-based solid electrolyte, a sulfide-based solid electrolyte, or both.

* * * * *